Patented Apr. 8, 1930

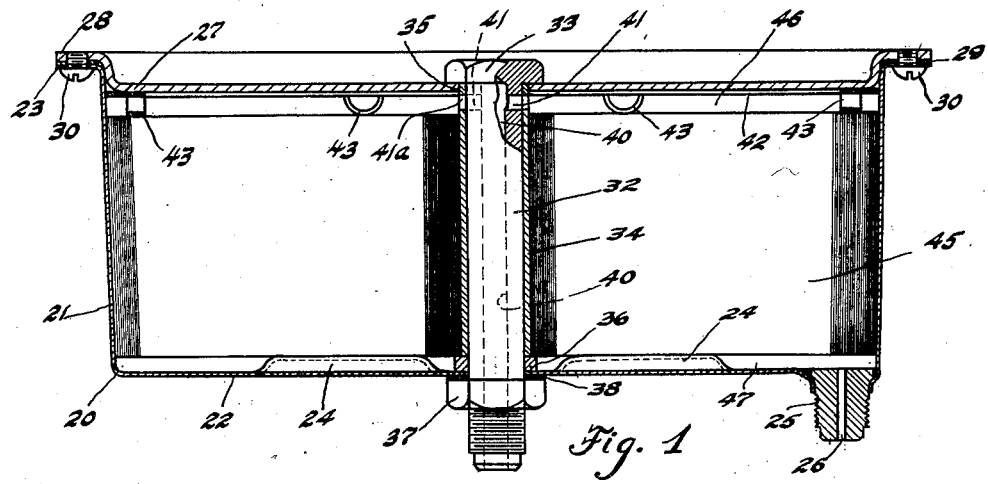
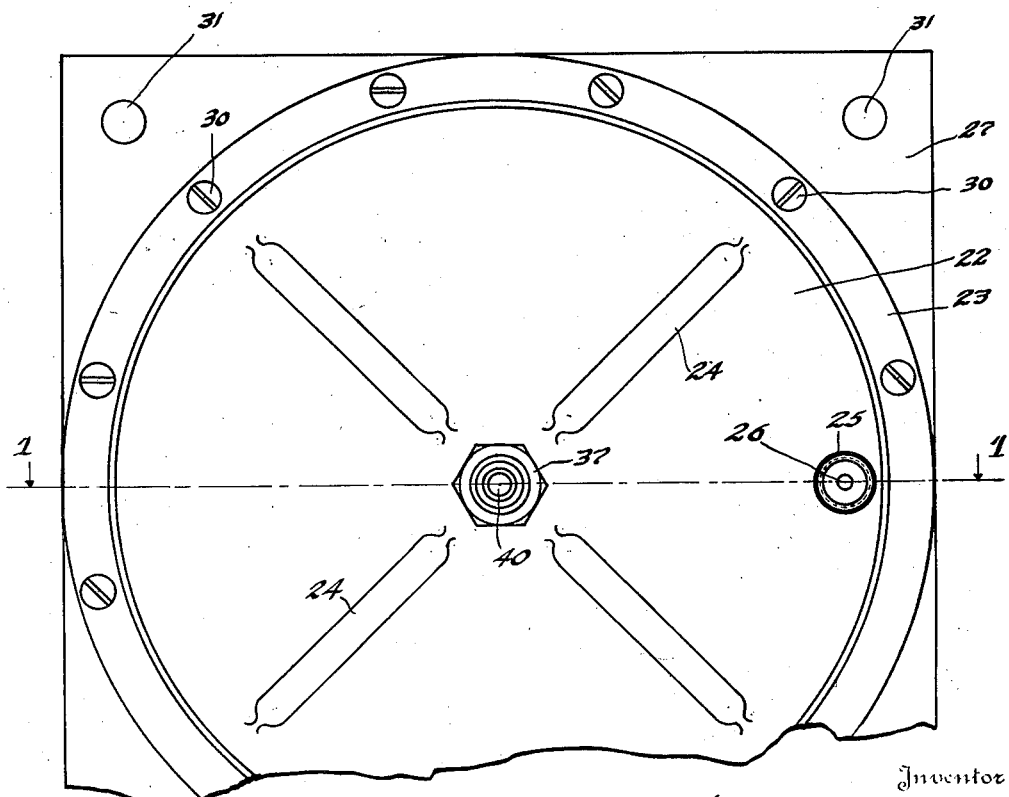

1,753,809

UNITED STATES PATENT OFFICE

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE

OIL FILTER

Application filed July 28, 1926. Serial No. 125,451.

This invention relates to improvements in filtering devices and more particularly to such devices used for the purpose of filtering the lubricant used in internal combustion engines.

It is among the objects of the present invention to provide a filtering device in which the filtering element is readily replaceable, and is of a structure that permits the fluid to be filtered to pass between closely adjacent layers instead of through a porous material, and in which a small but constant difference of pressure is maintained on opposite sides of the element.

Further objects and advantages will be apparent from the following description, reference being had to the accompanying drawing, wherein a preferred embodiment is shown.

In the drawings:

Fig. 1 is a section taken along the line 1—1 of Fig. 2.

Fig. 2 is a bottom plan, the structure illustrated in portion having been broken away.

The filter comprises a cup shaped casing 20 having a peripheral wall 21 and end wall 22 formed out of sheet material. The edge of the peripheral portion has a flange 23. The end wall 22 is provided with ribbed portions 24 which extend into the casing. A plug 25 is soldered or welded in an aperture formed in the end wall 22, said plug having a passage way 26 of predetermined size which communicates with the interior of the casing.

An inwardly dished cover 27 is adapted to fit in the open end of the peripheral wall 21 of the casing, said cover having a flange corresponding to the flange 23, which flanges are held together by means of screws 30. As shown in Fig. 2 the cover 27 is provided with apertures 31 to receive screws whereby the filter may be secured to any suitable supporting means.

A stud 32 having a head 33 fits in a sleeve 34 one end of which is secured in an aperture 35 provided in the cover 27, and the other end of sleeve 34 is substantially in the plane of the inner surfaces of ribbed portions 24 when the cover 27 is in position on the casing 20. Between the end of sleeve 34 and the end wall 22 of the casing there is a spacing collar 36 which acts as a support for the said sleeve and maintains its end level with the ribs 24. The stud 32 extends through the sleeve 34, collar 36 and an aperture provided in the end wall 22. The end of said stud extending outside the wall 22 is screw threaded to receive a nut 37 which is adapted to engage a gasket 38 interposed between the nut and the wall 22 of the casing. By screwing up the nut 37 the sleeve 34 is practically held between the head 33 of the stud and the collar 36 whereby the wall 22 of the casing and the cover 27 are held in proper, spaced relation.

The stud 32 is provided with a passage way 40 which extends from the end of the stud to within a short distance of the head 33. Transverse passages 41 are provided in the stud which are in alignment with corresponding passages 41$^a$ formed in the sleeve 34. These passages are of a predetermined size affording a larger passage for fluid than passage 26 in the plug 25 and communicate with the interior of the casing.

As can be seen in Fig. 1 the peripheral wall 21 of casing 20 tapers from the flanged portion 23 toward the end wall 22. The filtering element shown in the present drawing comprises a roll of fibrous sheet material, such as paper, which has a central opening adapted to fit over the sleeve 34. A spacer ring 42 is provided on the cover 27, said spacer ring having a plurality of spacing ears 43, as shown in Fig. 1.

The filtering element 45 is in the form of a roll, preferably of so-called crepe paper, having the crinkles or creases running in a general direction from end to end of the roll, or parallel with its axis and the direction of flow of the fluid being filtered. With the cover 27 removed this roll is placed on the sleeve 34 about which said roll tightly fits, so that one end presenting the edges of the plies composing the roll, engages with spacing ears 43 on a spacer ring 42 thus providing a space 46 between the cover and the filtering element 45. After the filtering element is placed in position, the cover is secured in position on the casing 20. The filtering element fits tightly within the casing, the outer edges of said element pressing against the tapered peripheral wall 21 as shown in Fig. 1. When the cover with its filtering element is in correct position with respect to the casing, the other end, or other surface of the filtering element presenting edges of the plies will engage with and rest upon the ribbed portions 24 so that a space or chamber 47 is provided between the wall 22 and the filtering element. Thus there will be an inlet chamber 46 on one side of the filter, and an outlet chamber 47 on the other side.

The screw threaded end of stud 32 may be connected with any suitable pipe leading from a device which will deliver lubricant under pressure through passage 41 and 41ᵃ to said chamber 46. The plug 25 may be connected to a pipe leading to the lubricant supply chamber, such as the crankcase of an engine.

When in operation, lubricant will be delivered under pressure through the passage way 40, apertures 41 and 41ᵃ of the stud 32 and sleeve 34 into the chamber 46 between the cover 27 and the filtering element 45. The size of the apertures 41 and 41ᵃ controls the flow of the lubricant into the space 46. After the lubricant has entered into space 46 it will be forced between the close lying layers of the roll of paper thus separating any solid matter from the lubricant. After passing through the filtering element 45 the clean or filtered lubricant will enter chamber 47, and flow through the passage 26, into the pipe connected with the lubricant supply chamber. The passage way 26 being of lesser size than the apertures 41 and 41ᵃ will not permit lubricant to flow from the filtering device as freely as it flows into the space above the filtering element, so that a small difference in pressure in favor of the chamber on the entrance side will be maintained irrespective of variations in the oil feed.

It will of course be understood that under varying conditions the comparative sizes of apertures 41 and 41ᵃ and channel 26 may vary to suit existing conditions.

The present device is of simple construction and design and may readily be disassembled to allow replacement of a dirty or worn out filtering element. Such replacement requires very little time and may be easily completed.

While the form of embodiment of the present invention as herein disclosed, constitutes a preferred form, it is to be understood that other forms might be adopted, all coming within the scope of the claims which follow.

What is claimed is as follows:

1. A filter comprising, in combination, a cup-shaped casing including a side wall and an annular wall tapering toward said side wall; ribbed portions on the side wall extending into the casing; a filtering element in said casing fitting tightly against the annular wall and engaging the ribbed portions whereby a space is provided between the filtering element and the side wall; a cover for the casing; a spacer ring interposed between the filtering element and cover so as to provide a space therebetween; a conduit communicating with the space on one side of the filtering element; and a second conduit, smaller than the first mentioned conduit communicating with the space on the other side of the filtering element.

2. A filter comprising, in combination, a cup-shaped casing having a side wall and an annular wall tapering toward said side wall; inwardly-extending ribs formed on the side wall; a cover for the casing; a filtering element comprising a roll of paper fitting tightly in said casing and having its one edge surface resting against the ribs of the side wall, forming a space between the filtering element and side wall, the other edge surface being in spaced relation to the cover; a stud secured to the cover and extending through an aperture in the side wall, said stud having a channel which communicates with the space between the filtering element and cover by means of fixed orifices; and a plug secured in an aperture in the side wall, said plug having a passage of lesser diameter than said orifices, and providing communication with the space between the filtering element and the side wall of the casing.

3. In a filter, a filtering material therein, a cover for said filter positioned closely adjacent said material, a flat separating ring between said cover and filtering material, and a plurality of projections on said ring to hold said material away from said cover.

In testimony whereof I affix my signature.

CHARLES R. SHORT.